(12) United States Patent
Deng et al.

(10) Patent No.: US 7,756,358 B2
(45) Date of Patent: Jul. 13, 2010

(54) SYSTEM AND METHOD OF ALIGNING IMAGES

(75) Inventors: Yining Deng, San Mateo, CA (US); D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1625 days.

(21) Appl. No.: 11/000,660

(22) Filed: Nov. 30, 2004

(65) Prior Publication Data

US 2006/0115181 A1   Jun. 1, 2006

(51) Int. Cl.
G06K 9/32 (2006.01)
(52) U.S. Cl. .................. 382/294; 345/581; 345/619; 345/645; 345/651; 345/677; 382/284; 382/293
(58) Field of Classification Search .................. None
See application file for complete search history.

(56) References Cited

U.S. PATENT DOCUMENTS

| | | | |
|---|---|---|---|
| 5,138,460 A | | 8/1992 | Egawa |
| 5,444,478 A | | 8/1995 | Lelong et al. |
| 5,982,951 A | | 11/1999 | Katayama et al. |
| 6,075,905 A | * | 6/2000 | Herman et al. ............ 382/284 |
| 6,078,701 A | * | 6/2000 | Hsu et al. ................. 382/294 |
| 6,097,854 A | * | 8/2000 | Szeliski et al. ........... 382/284 |
| 6,173,087 B1 | * | 1/2001 | Kumar et al. ............. 382/284 |
| 6,181,441 B1 | | 1/2001 | Walsh |
| 6,348,981 B1 | | 2/2002 | Walsh |
| 6,434,280 B1 | * | 8/2002 | Peleg et al. .............. 382/299 |
| 6,714,249 B2 | | 3/2004 | May et al. |
| 6,721,952 B1 | * | 4/2004 | Guedalia et al. ........... 725/38 |
| 6,750,873 B1 | * | 6/2004 | Bernardini et al. ....... 345/582 |
| 6,813,391 B1 | | 11/2004 | Uyttendaele et al. |
| 6,985,619 B1 | * | 1/2006 | Seta et al. ................ 382/154 |
| 7,194,115 B2 | * | 3/2007 | Uchida ..................... 382/124 |
| 2002/0094135 A1 | * | 7/2002 | Caspi et al. .............. 382/294 |
| 2002/0196974 A1 | * | 12/2002 | Qi et al. .................. 382/170 |
| 2004/0001705 A1 | * | 1/2004 | Soupliotis et al. ........ 386/117 |

* cited by examiner

*Primary Examiner*—Kee M Tung
*Assistant Examiner*—Jwalant Amin (57) ABSTRACT

A method performed by a processing system. The method includes receiving a sequence of frames, each frame comprising a sequence of at least two images, each image at a different image position in the sequence and each pair of adjacent images having an overlap region. A local alignment value is determined for the images of each pair of adjacent image positions of each frame based on minimizing a difference of a desired parameter between the images in the overlap region. Global alignment values are determined for all images at corresponding pairs of adjacent image positions of each frame based on the local alignment values for the images at the corresponding pair of adjacent image positions of each frame. Each global alignment value is applied to at least one image of the images of the corresponding pair of adjacent image positions of each frame.

30 Claims, 5 Drawing Sheets

SYSTEM AND METHOD OF ALIGNING IMAGES

BACKGROUND

Panoramic stitching is a process that aligns and stitches together images having partially overlapping regions of the same scene which are taken by one or more cameras to obtain a single panoramic view of the scene. When multiple cameras are used, the cameras are typically positioned at different viewing angles at a center of the scene and carefully calibrated so as to provide overlaps between the different views of the scene.

In the case of movies/videos, the calibration parameters used with the camera set-up when the images were initially taken are later employed to stitch together the multiple movies/videos to produce a panoramic movie/video or to align the images when projecting them on a wide screen to reproduce the panoramic scene. Unfortunately, however, there are typically slight inaccuracies in the calibration parameters of the multiple cameras. For example, in the case of Cinerama (widescreen) movies, camera calibration may be off by as much as two percent of the film width. Such calibration errors, though seemingly slight, result in visual artifacts in the displayed panoramic images.

It would be desirable to be able to more accurately align multiple images to reduce visual artifacts in panoramic images, movies, and videos.

SUMMARY

In one embodiment, the present invention provides a method performed by a processing system. The method includes receiving a sequence of frames, each frame comprising a sequence of at least two images, each image at a different image position in the sequence and each pair of adjacent images having an overlap region. A local alignment value is determined for the images of each pair of adjacent image positions of selected frames based on minimizing a difference of a desired parameter between the images in the overlap region. Global alignment values are determined for all images at corresponding pairs of adjacent image positions of each frame based on the local alignment values for the images at the corresponding pair of adjacent image positions of the selected frames. Each global alignment value is applied to at least one image of the images of the corresponding pair of adjacent image positions of each frame.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different. orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1A:
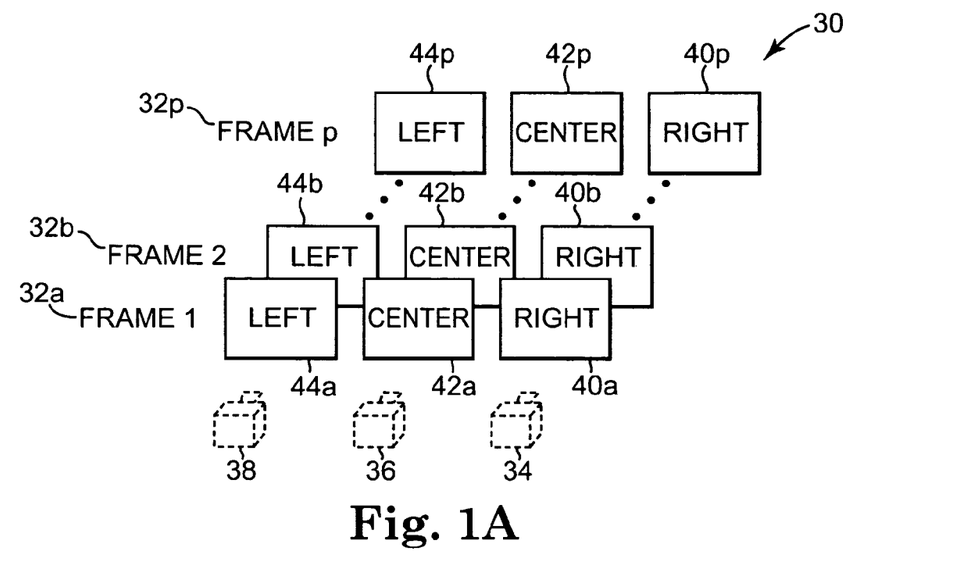
FIG. 1A illustrates generally an example of an unaligned shot of a panoramic movie/video.

FIG. 1A illustrates generally an example of a shot 30 of a panoramic scene comprising a sequence of frames, illustrated as frames 32a through 32p. Each frame 32 comprises a sequence of images, with each image being at a different position in the sequence. When making a panoramic video or movie, three cameras are often employed, such as cameras 34, 36 and 38, with each camera providing a different image of the sequence of each frame 32. As illustrated, cameras 34, 36, and 38 respectively provide a right image 40, a center image 42, and a left image 44 of each frame 32.

Figure 1B:
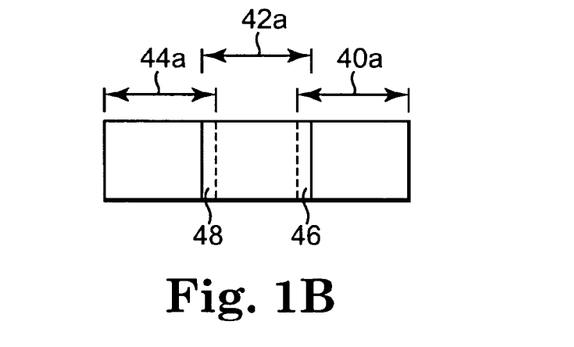
FIG. 1B illustrates generally an example of overlapping images of a frame of images from the shot of FIG. 1A.
Figure 1C:
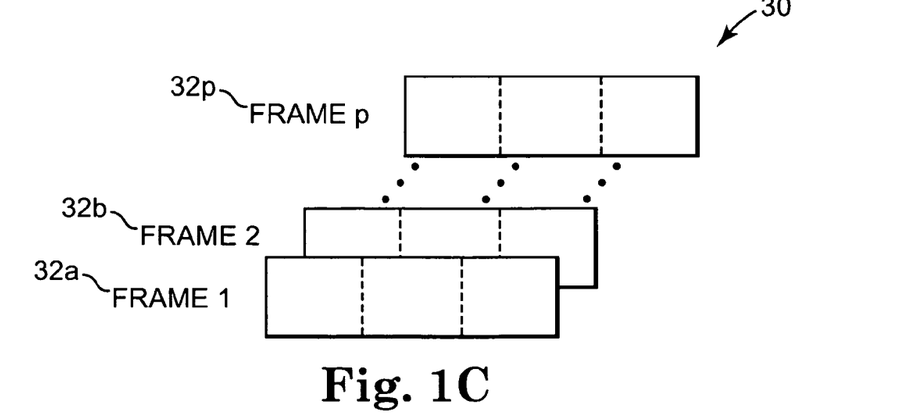
FIG. 1C illustrates generally the shot of FIG. 1A after alignment.

The cameras are typically located at a center of the panoramic scene and positioned at differing angles such that images at adjacent positions in the sequence of images of each frame 32 overlap one another. As such, as illustrated by FIG. 1B, center image 42 and right image 40 have an overlap region 46, and center image 42 and left image 44 have an overlap region 48. The images of each frame 32 are aligned so that the images of each frame together form a single image of the scene, as illustrated by FIG. 1C.

Although described above with regard to cameras, panoramic images can be formed by combining images acquired from other types of image capturing devices as well, including devices such as scanners and camcorders, for example. Processes and systems enclosed herein for aligning images in accordance with embodiments of the present invention apply to panoramic images formed from multiple images acquired from any such image capturing device.

Figure 2:
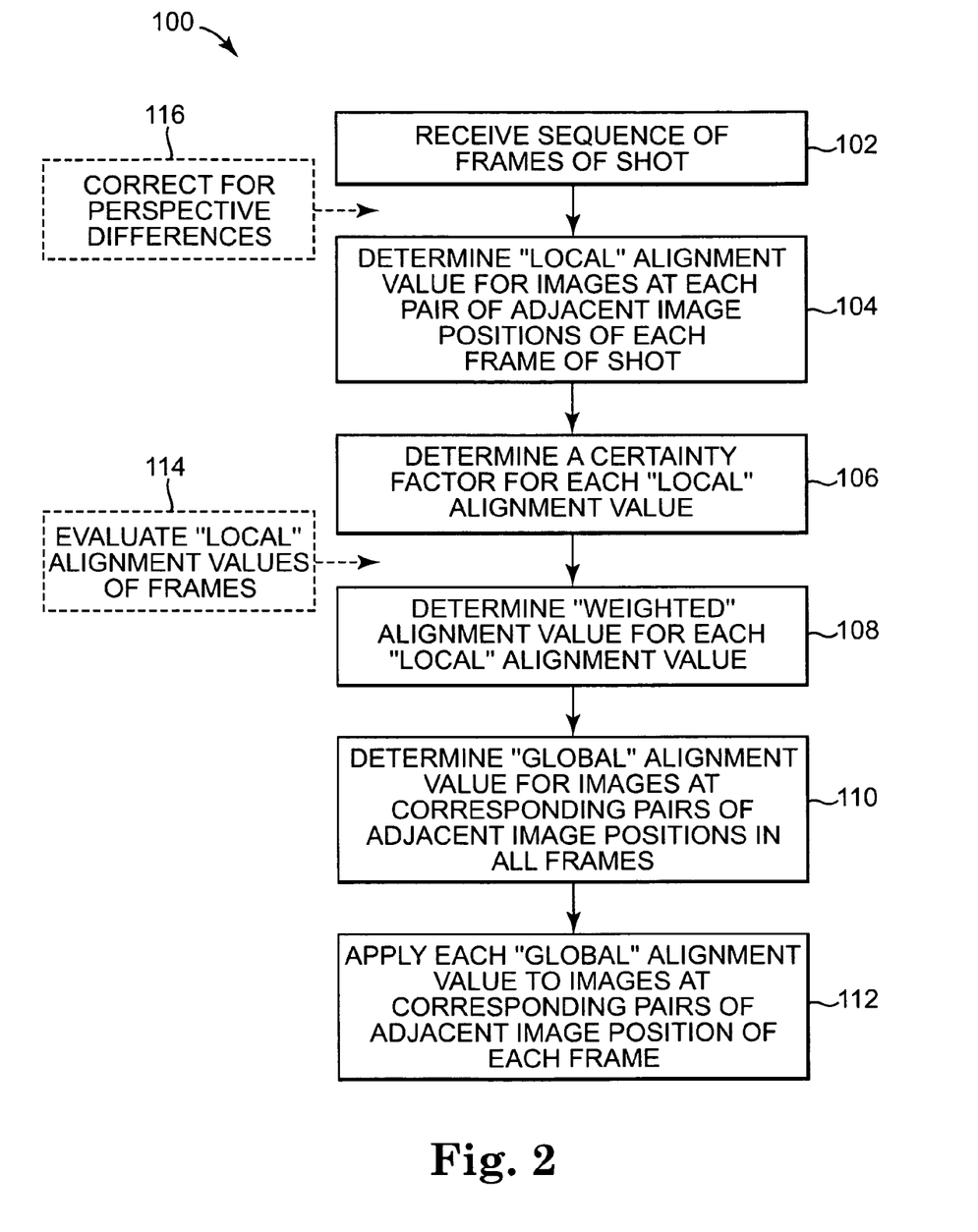
FIG. 2 is a flow diagram illustrating a process for stitching multiple images of multiple frames of a panoramic movie/video according to one exemplary embodiment of the present invention.

In general, FIG. 2 is a flow diagram illustrating a process 100 according to one exemplary embodiment of the present invention for aligning images to generate a panoramic image. More specifically, FIG. 2 is flow diagram of a process 100 in accordance with one embodiment of the present invention for aligning multiple images of multiple frames of a shot of a panoramic movie/video, such as example shot 30 of FIG. 1. Process 100 begins at 102, where frames 32a through 32p of shot 30 are received. At 104, a "local" alignment transform, or alignment value, is determined for each pair of images at each pair of adjacent image positions for each frame. An alignment value is a value or function that when applied to one image of the pair shifts the one image relative to the other image such that the overlap regions of the pair of images are substantially aligned.

Alignment values can be calculated using any one of a plurality of transform models known to those skilled in the art, such as the 2D translational model and the 2D affine model. Each image comprises an array of pixels, with each pixel represented by a number of color channel values, such as red (R), blue (B), and green (G) color channels, generally referred to as RGB channels. To align a pair of images, the selected transform model searches over a range of overlapping positions of the first and second images. At each position, the transform model determines an error margin of a selected parameter between overlapping pixels of each image. The position at which the error margin of the selected parameter between the overlapping pixels is minimized is considered to be the alignment position.

In one embodiment, for example, the selected parameter may be the color of the overlapping pixels. In such a scenario, a mean square error (MSE) between the individual RGB color channels of each pixel is summed. The mean square error for all pixels is then summed to determine a total mean square error, which is then divided by the number of pixels in the overlap region to get an average mean square error per pixel. The position at which the average mean square error per pixel is minimized is considered to be the alignment position.

The movement of the first image relative to the second image that results in the minimized error margin is referred to as an alignment transform, or alignment value. When employing a 2D translational model, for instance, the alignment value may comprise a pair of values indicating how much the first image was moved in the x- and y-dimensions relative to the second image. When employing a 2D affine model, for instance, the alignment value may comprise a pair of values indicating how much the first image was moved in the x- and y-dimensions relative to the second image and an angle indicating how much the first image was rotated relative to the second image.

As mentioned above, a local alignment value is determined for each pair of images at each pair of adjacent image positions of each frame. For example, for first frame 32a, a local alignment value $AV(R,C)_1$ is determined between image 40a in the right image position and image 42a in the center image position, such that when local alignment value $AV(R,C)_1$ is applied to right image 40a, right image 40a is shifted, or repositioned, relative to center image 42a such that the overlap regions of right image 40a and center image 42a substantially align, as illustrated overlap region 46 of FIG. 1B. Similarly, a local alignment value $AV(L,C)_1$ is determined between image 44a in the left image position and image 42a in the center image position, such that when local alignment value $AV(L,C)_1$ is applied to left image 44a, left image 44a is shifted, or repositioned, relative to center image 42a such that the overlap regions of left image 44a and center image 42a substantially align, as illustrated by overlap region 48 of FIG. 1B.

The above process is repeated for each frame of shot 30, concluding with the determination of alignment values $AV(R,C)_p$ and $AV(L,C)_p$ corresponding respectively to the pairs of images comprising right image 40p and center image 42p, and left image 44p and center image 42p of frame 32p.

Process 100 then proceeds to 106, where a certainty factor is determined for each of the above described alignment values determined at 104. A certainty factor is a value that is associated with each alignment value and represents an estimate of how well the overlap regions of the pair of images are aligned. The alignment value can be based on one or more characteristics of the overlap regions. For example, in one embodiment, the alignment values are based on the magnitude of the corresponding MSE determined at 104, with the certainty factor being inversely proportion to the MSE. The larger the MSE, the smaller the certainty factor will be and vice-versa.

In one embodiment, the alignment values are based on the high frequency content, or energy, of the overlap regions of the corresponding pair of images. High frequency content can be determined using any one of a number of techniques which are known to those skilled in the art. Most, however, employ high pass filtering techniques to calculate the high frequency energy of localized regions (i.e. the overlap regions).

High frequency spatial information is characterized by abrupt changes in pixel intensity occurring over a narrow range of pixels, whereas low-frequency spatial information is characterized by gradual changes in pixel intensity that occur over a broad range of pixels. Examples of high frequency content include edges and boundaries between features, while examples of low frequency content include regions of the background characterized by shading that varies gradually throughout the image. The greater the high frequency energy of the overlap regions, the better the alignment is likely to be between the overlap regions of the images. As such, in one embodiment, the certainty factor is proportional to the high frequency content.

In one example embodiment, the certainty factor (CF) is provided by the following Equation I:

$$CF = \text{High Frequency Energy}/MSE. \quad \text{Equation I}$$

In another example embodiment, CF is provided by the following Equation II:

$$CF = (A*\text{High Frequency Energy}) + (B/MSE); \quad \text{Equation II}$$

where A and B are constants selected to achieve a desired balance the contributions from the high frequency energy and the MSE.

Regardless of the characteristics or techniques employed, certainty factors are determined for each alignment value, beginning with certainty factors $CF(R,C)_1$ and $CF(L,C)_1$ corresponding respectively to alignment values $AV(R,C)_1$ and $AV(L,C)_1$ of first frame 32a and ending with certainty factors $CF(R,C)_p$ and $CF(L,C)_p$ corresponding respectively to alignment values $AV(R,C)_p$ and $AV(L,C)_p$ of last frame 32p of shot 30.

At 108, each alignment value determined at 104 is adjusted, or weighted, based on the corresponding certainty factor determined at 106 above. In one embodiment, the weighted alignment value is determined by multiplying each alignment value by its corresponding certainty factor. As such, a weighted alignment value is determined for the pair of images at each pair of image positions of each frame beginning with weighted alignment values $AV'(R,C)_1$ and $AV'(L,C)_1$ of first frame 32a and ending with weighted alignment values $AV'(R,C)_p$ and $AV'(L,C)_p$ of last frame 32p of shot 30.

Process 100 then proceeds to 110 where a global alignment value is determined for all pairs of images at corresponding pairs of adjacent positions in each frame based on the weighted alignment values and certainty factors determined above at 106 and 108. In the illustrated example, a pair of global adjustment values GAV(R,C) and GAV(L,C) are determined that respectively apply to each pair of images at the right and center image positions and left and center image positions of each frame 32a through 32p. In one embodiment, the global alignment values comprise a weighted average, based on the corresponding certainty factor, of the local alignment values at the corresponding pair of adjacent image positions of each frame. As such, in one embodiment, global alignment values GAV(R,C) and GAV(L,C) are provided respectively by the following Equations III and IV:

Equation III:

$$GAV(R, C) = \frac{\sum_{x=1}^{p} AV'(R, C)_x}{\sum_{x=1}^{p} CF(R, C)_x}$$

Equation IV:

$$GAV(L, C) = \frac{\sum_{x=1}^{p} AV'(L, C)_x}{\sum_{x=1}^{p} CF(L, C)_x}$$

At 112, each of the global alignment values determined at 110 is applied to at least one image of the pair of images at the corresponding pair of adjacent positions of each frame. In the illustrated example, GAV(R,C) is applied to each of the images 40a through 40p in the right image position of each frame 32a through 32p such that images 40a through 40p are respectively repositioned relative to center images 42a through 42p such that their overlap regions are substantially aligned. Similarly, GAV(L,C) is applied to each of the images 44a through 44p in the left image position of each frame 32a through 32p such that images 44a through 44p are respectively repositioned relative to center images 42a through 42p such that their overlap regions are substantially aligned. After alignment, the images 40 through 44 of each frame are stitched together as previously illustrated by FIG. 1C.

In summary, an alignment process in accordance with embodiments of the present invention, such as alignment process 100, uses processing techniques to determine the alignment between images of movie/frames taken by multiple capturing devices to obtain the "true" capturing device positions during the shot. As such, an alignment process in accordance with embodiments of the present invention provides more accurate alignment than using camera calibration parameters alone and substantially eliminates problems associated with error in the calibration parameters. Furthermore, due to errors, noise, and other factors, individual alignment values between corresponding pairs of adjacent images may vary from frame to frame of the shot. Thus, by assuming that the relative positions of capturing devices does not vary within a shot, employing global alignment values reduces "jumpiness" between frames by providing a smoother and more consistent alignment between frames the entire shot.

As described, process 100 determines alignment values based on repositioning the images in the right and left image positions relative to the image in the center position. As such, images in the center positions of each frame, such as image 42a of frame 32a, can be referred to as the reference images. However, process 100 could readily be modified so that the images in any one of the image positions can be the reference images, so long as the image position of the reference image is consistent across all of the frames.

For example, process 100 could be modified such that the images in the left image position are the reference positions. In such an instance, the alignment values corresponding to the images in the left and center positions of each frame are determined based on repositioning the image in the center image position relative to the image in the left image position. The alignment values corresponding to the images in the right and center positions of each frame are then determined based on repositioning the image in the right image position relative to the repositioned location of the image in the center image position.

While such an approach could be employed, the further repositioned images are removed from the reference position, the less accurate the alignment is likely to be due to the compounding effects of any errors that may be present in each of the successive alignment values. While such errors may not be significant when each frame comprises a relatively few number of images, such errors can be become more significant when the frames include a larger number of images, such as illustrated below by FIG. 3. As such, in a preferred embodiment, the reference images comprise the images in the center image position of each frame so as to improve the accuracy of the alignment process.

In one embodiment, process 100 further includes, at 114, an evaluation of each of the local alignment values for the images of each frame relative to the local alignment values for images at corresponding pairs of adjacent image positions of the other frames. In some instances, a local alignment value for the images at a pair of adjacent image positions may vary greatly from local alignment values for the images at the corresponding pair of adjacent images positions of the other frames of the shot, but yet have a confidence factor indicating that there is a high likelihood that the images are very well aligned.

In such an instance, the alignment value for the images at that pair of adjacent image positions may not be included in the determination of the global alignment values for the images of the corresponding pairs of adjacent image positions, and the local alignment value associated with the images at that pair of adjacent image positions may be applied to align the images in lieu of the global alignment value. In such an instance, notification is given that sequence of images in the corresponding frame may not be well aligned. As illustrated by the dashed lines at 114, the evaluation is performed after determination of the certainty factors at 106 and before determination of the weighted alignment values at 108.

As described above with respect to FIG. 1A, each of the capturing devices, such as cameras 34, 36, and 38, are often positioned at varying angles relative to one another at a center of the panoramic scene. As such, each camera has a different perspective of the scene, resulting in slight difference in appearance between a same object in each image. As such, in one embodiment, process 100 further includes correcting for perspective differences prior to determining local alignment values at 104, as indicated by the dashed block at 116. In one embodiment, a geometric progression, as is know by those skilled in the art, can be applied to the images to "warp" the images onto a common sphere or cylinder based on the known camera angles.

Figure 3:
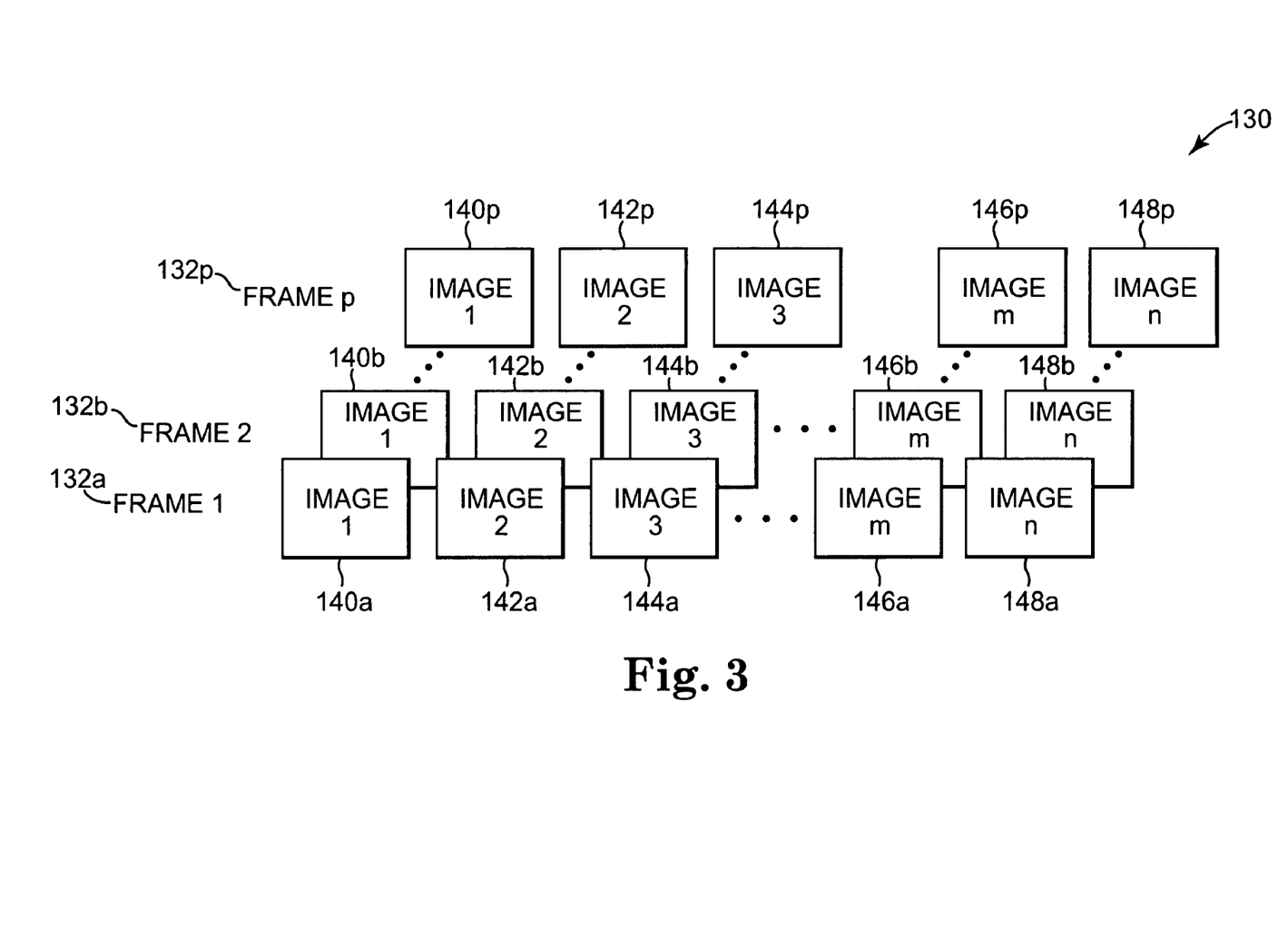
FIG. 3 illustrates generally another example of an unaligned shot of a panoramic movie/video.

Additionally, while process 100 was described above with regard to a panoramic shot comprising frames having three images, such as shot 30 illustrated by FIGS. 1A through 1C, process 100 can be modified to apply to shots comprising any number of images, such as shot 130 illustrated by FIG. 3. Shot 130 comprises a sequence of "p" frames, 132a through 132p, with each frame 132 comprising a sequence of "n" images, with each of the images being at one of "n" image positions, such as images 140a through 148a of frame 132a.

Similar to that described above with respect to shot 30, an alignment value is determined for each pair of adjacent image positions of each frame, beginning with alignment values $AV(1,2)_1$ through $AV(m,n)_1$ of frame 132a and ending with alignment values $AV(1,2)_p$ through $AV(m,n)_p$ of frame 132p. As described above, each of the alignment values is determined relative to a reference image. Also as described above, to improve the accuracy of the alignment process, it is desirable that the reference image be an image that is at an image position that is substantially at the center of the sequence of images comprising each frame 132.

Also similar to that described above with respect to shot 30, certainty factors and weighted alignment values corresponding to each of the alignment values are determined. Global alignment values GAV(1,2) through GAV(m,n) are subsequently determined and applied to at least one of the images at the corresponding pair of adjacent image positions in each of the frames 132*a* through 132*p*.

Figure 4:
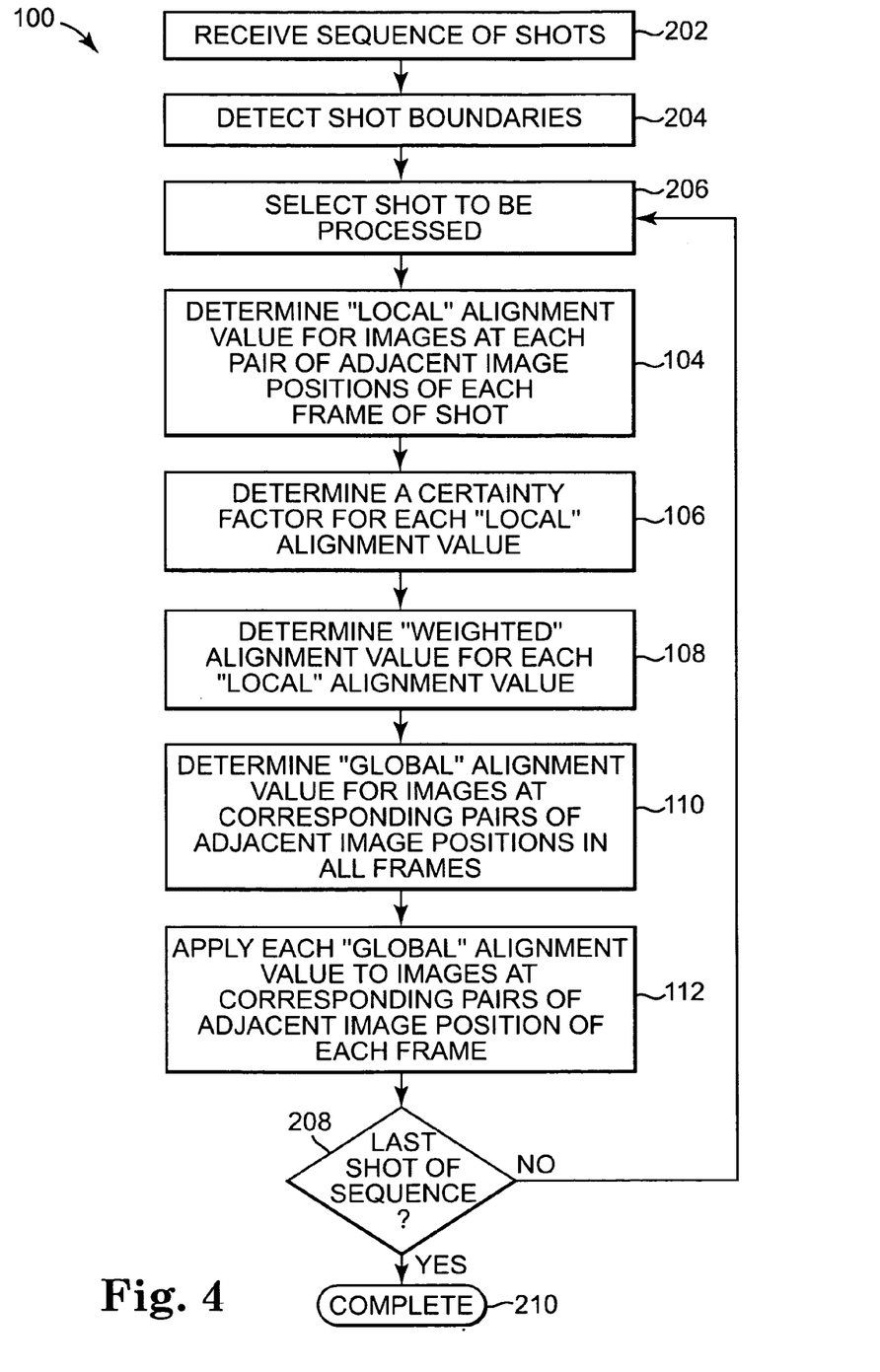
FIG. 4 is a flow diagram illustrating a process for aligning multiple images of multiple frames of a panoramic movie/video according to one exemplary embodiment of the present invention.

FIG. 4 is a flow diagram illustrating an alternate embodiment of alignment process 100 as illustrated by FIG. 2, wherein process 100 starts at 202 by receiving a sequence of shots, with each shot comprising a sequence of frames, such as illustrated by shot 30 of FIG. 1A. At 202, the boundaries of each individual shot are determined. In one embodiment, determination of the shot boundaries is determined manually. In one embodiment, shot boundaries are determined based on a difference of the average pixel intensities between frames. Such an approach is known to those skilled in the art for determining shot boundaries. At 206, a shot from the sequence of shots is selected for alignment processing. Generally, the first shot of the sequence of shots received at 202 is selected. It should be noted that blocks 202 through 206 are in lieu of block 102. The images of the selected shot are then aligned at 104 through 112 as described above relative to FIG. 2. At 208, after 112, it is queried whether the just-aligned shot is the final shot of the sequence of shots to be aligned. If the answer to the query is "yes," the alignment process is complete, as indicated at 210. If the answer to the query is "no," process 100 returns to 206 where another shot of the sequence is selected and aligned.

Figure 5:
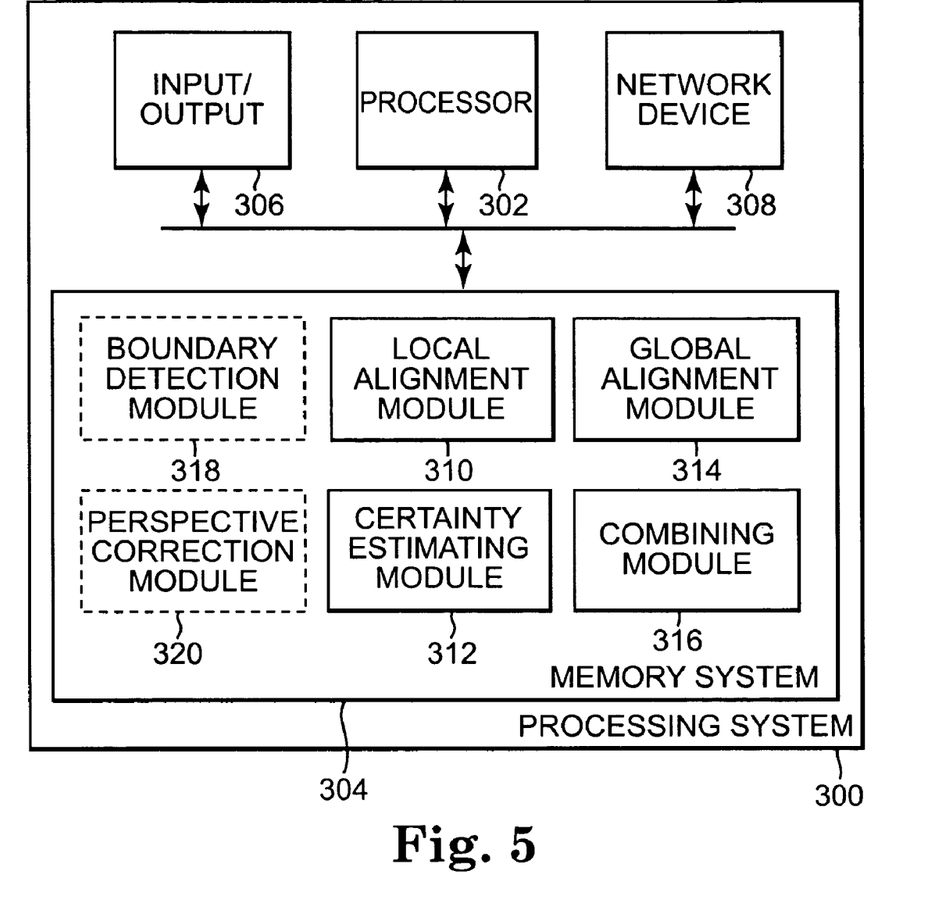
FIG. 5 is a block diagram illustrating a processing system for aligning multiple images of multiple frames of a panoramic movie/video according to one exemplary embodiment of the present invention.

FIG. 5 is a block diagram illustrating a processing system 300 configured to align images of frames of panoramic movies/videos, such as those illustrated by FIG. 1A. Processing system 300 comprises a processor 302, a memory system 304, an input/output 306, and a network device 308. Memory system 304 comprises a local alignment module 310, a certainty estimating module 312, a global alignment module 314, and a combining module 316. In one embodiment, memory system 304 further includes a boundary detection module 318 and a perspective correction module 320. Processing system 300 comprises any type of computer system or portable or non-portable electronic device. Examples include desktop, laptop, notebook, workstation, or server computer systems. Examples of electronic devices include digital cameras, digital video cameras, printers, scanners, mobile telephones, and personal digital assistants.

In one embodiment, local alignment module 310, certainty estimating module 312, global alignment module 314, combining module 316, boundary detection module 318, and perspective correction module 320 each comprise instructions stored in memory system 304 that are accessible and executable by processor 302. Memory system 304 comprises any number of types of volatile and non-volatile storage devices such as RAM, hard disk drives, CD-ROM drives, and DVD drives. In other embodiments, local alignment module 310, certainty estimating module 312, global alignment module 314, combining module 316, boundary detection module 318, and perspective correction module 320 may comprise any combination of hardware and software components configured to perform the functions described herein.

A user of processing system 300 controls the operation of local alignment module 310, certainty estimating module 312, global alignment module 314, combining module 316, boundary detection module 318, and perspective correction module 320 by providing inputs and receiving outputs via input/output unit 306. Input/output unit 306 may comprise any combination of a keyboard, mouse, display device, or other input/output device that is coupled directly, or indirectly, to processing system 300.

Local alignment module 310, certainty estimating module 312, global alignment module 314, combining module 316, boundary detection module 318, and perspective correction module 320 may each be stored on a medium separate from processing system 300 prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 300 may access local alignment module 310, certainty estimating module 312, global alignment module 314, combining module 316, boundary detection module 318, and perspective correction module 320 from a remote processing or storage system (not shown) that comprises the medium using network device 308.

In operation, processing system 300 receives via input/output unit 306 a shot of a movie/video comprising a sequence of frames, such as shot 30 illustrated by FIG. 1. Each frame comprises a sequence of two or more images, with each image being a different image position in the sequence, and with the images of each pair of adjacent image positions having an overlap region. Processing system 300 executes local alignment module 310 to determine a local alignment value for the images of each pair of adjacent image positions of each frame based on minimizing a difference between a parameter of the images in the overlap region, such as described at 104 of process 100 of FIG. 2.

Processing system 300 then executes certainty estimating module 312 to determine a certainty factor for each local alignment value provided by local alignment module 310 based on at least one parameter of the images in the overlap region, such as described at 106 of process 100 of FIG. 2. Global alignment module 314 is then executed by processing system 300 to determine global alignment values for all images at corresponding pairs of adjacent image positions of each frame based on the local alignment values and certainty factors for the images at the corresponding pair of adjacent image positions of each frame. In one embodiment, global alignment module determines global alignment values in a fashion similar to that described at 108 and 110 of process 100 of FIG. 2.

Processing system 300 then executes combining module 316 to apply the global alignment values to one image of the pair of images at the corresponding pair of adjacent image positions of each frame so as to substantially align the images, such as described at 112 of process 100 of FIG. 2. After application of each of the global alignment values to the images at the corresponding pair of adjacent image positions of each frame, the sequence of images of each frame of images is substantially aligned, as illustrated by FIG. 1C.

In one embodiment, processing system 300 receives a sequence of shots, with each shot comprising a sequence of frames as illustrated by shot 30 of FIG. 1A. Process 300 executes boundary detection module 318 to detect the boundaries between each shot and to separate the frames into individual shots, such as described by 204 and 206 of process 100 of FIG. 4.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
receiving, with a processing system, a sequence of frames, the frames together forming a shot, each frame comprising a sequence of at least two image positions with an image acquired from a corresponding image capturing device at each image position, wherein the images corresponding to each pair of adjacent image positions have an overlap region;
determining, with a processor of the imaging system, a set of local alignment values for each frame of a selected group of at least two frames of the shot, each set of local alignment values including one local alignment value for each pair of adjacent image positions of the frame which is based on minimizing a difference of a desired parameter between the corresponding images in the overlap region;
determining, with the processor, a single set of global alignment values for the shot, the set of global alignment values including one global alignment value for each pair of same adjacent image positions of all frames of the shot, wherein each global alignment value is based on the local alignment value for the corresponding pair of adjacent image positions of all sets of local alignment values; and
applying, with the processing system, each global alignment value to at least one of the images at the corresponding pair of adjacent image positions of every frame of the shot to adjust a position of the at least one image relative to the other image.

2. The method of claim 1, further including:
determining a certainty factor for each local alignment value based on at least one parameter of the images in the overlap region, and wherein determining each of the global alignment values is based on the local alignment values and certainty factors for the images at the corresponding pair of adjacent image positions of the selected frames.

3. The method of claim 2, wherein the global alignment values comprise a weighted average of the local alignment values for the images at the corresponding pair of adjacent images positions of the selected frames, wherein each local alignment value is weighted based on the corresponding certainty factor.

4. The method of claim 1, wherein the selected frames comprise all frames of the sequence of frames.

5. The method of claim 1, wherein the desired parameter for determining the local alignment value comprises values associated with one or more color channels of pixels in the overlap region of each image.

6. The method of claim 1, wherein the desired parameter for determining the local alignment value comprises an intensity of pixels in the overlap region of each image.

7. The method of claim 1, wherein determining a local alignment value for the images of each pair of adjacent image positions includes applying a transform model to the overlap region of the images.

8. The method of claim 7, where the transform model comprises a 2D translational model.

9. The method of claim 7, wherein the transform model comprises a 2D Affine model.

10. The method of claim 7, wherein determining the certainty factor for each local alignment value is based at least partially on a magnitude of the difference of the desired parameter between the corresponding images in the overlap region.

11. The method of claim 1, wherein determining the certainty factor for each local alignment value is based at least partially on an amount of high frequency content of the overlap region of the corresponding images.

12. The method of claim 1, wherein determination of the local alignment values is made relative to a selected reference image in each frame.

13. The method of claim 12, wherein the selected reference image of each frame is at an image position approximately at a center of the sequence of images.

14. The method of claim 12, wherein the selected reference image is at a same image position in each frame.

15. The method of claim 12, wherein the selected reference image comprises an image at a center position of the sequence when each frame comprises three images, with one image being at a right image position and one image being at a left image position relative to the selected reference position at the center position.

16. The method of claim 1, wherein prior to determining local alignment values, the method further comprises:
correcting the image at each image position of each frame for perspective differences based on a viewing angle of an image capture device corresponding to each image position and employed to provide the images at the corresponding image position of each frame.

17. The method of claim 16, wherein correcting each frame for perspective differences includes applying a geometric progression to warp each of the images of a frame to a common sphere.

18. The method of claim 1, further comprises:
receiving a sequence of shots, each shot comprising a sequence of frames; and
determining boundaries between each shot based on a parameter of the images of the frames of each shot.

19. The method of claim 1, wherein determining boundaries is based on a difference between average intensities of pixels comprising the images of each frame of each shot.

20. The method of claim 1, wherein the selected parameter comprises an intensity of pixels in the overlap region.

21. A system comprising:
a memory system including:
a local alignment module;
a global alignment module; and
a combining module; and
a processor, wherein upon the system receiving a shot comprising a sequence of frames, each frame comprising a sequence of at least two image positions with an image at each image position, wherein the images at each pair of adjacent image positions have an overlap region, the processor is configured to:
execute the local alignment module to determine a set of local alignment values for each frame of at least two selected frames of the shot, each set of local alignment values including one local alignment values for each pair of adjacent image positions of the frame which is based on minimizing a difference of a desired parameter between the corresponding images in the overlap region;
execute the global alignment module to determine a single set of global alignment values for the shot, the set of global alignment values including one global alignment value for each pair of same adjacent image positions of all frames of the shot, wherein each global alignment value is based on the local alignment value for the corresponding pair of adjacent image positions of all sets of local alignment values; and execute the combining module to apply each global alignment value to at least one of the images at the corresponding pair of adjacent image positions of each frame.

22. The system of claim 21, wherein the memory system further includes a certainty estimating module which is executed by the processor, prior to executing the global alignment module to determine a certainty factor for each local alignment value based on at least one parameter of the images in the overlap region, and wherein determining each of the global alignment values is based on the local alignment values and certainty factors for the images at the corresponding pair of adjacent image positions of the selected frames.

23. The system of claim 21, wherein the memory system further includes a perspective correction module which is executed by the processor, prior to execution of the local alignment module, to correct the image at each image position of each frame for perspective differences based on a viewing angle of an image capture device corresponding to each image position and employed to provide the images at the corresponding image position of each frame.

24. The system of claim 21, wherein the memory system further includes a boundary detection module, wherein subsequent to the system receiving a sequence of shots, each shot comprising a sequence of frames, the processor executes the boundary detection module to determine boundaries between each shot based on a parameter of the images of the frames of each shot.

25. A method performed by a processing system on a sequence of frames forming a shot, each frame comprising a sequence of at least two image positions with an image acquired from a corresponding image capturing device at each image position in the sequence, wherein the images at each pair of adjacent image positions have an overlap region, the method comprising:

determining, with a processor of the processing system, a set of local alignment values for each frame of a selected number of frames of the shot, each set of local alignment values having a local alignment value for the images at each pair of adjacent image positions of the frame;

determining, with the processor, a single set of global alignment values for all frames of the shot, one global alignment value for the same pair of adjacent image positions of each frame and which is based on the local alignment values of the corresponding pair of adjacent image positions of the selected frames; and applying, with the processor, each global alignment value to at least one of the images of the corresponding pair of adjacent image positions of each frame, to adjust a position of the at least one image relative to the other image.

26. A system comprising:

an input/output unit to receive a sequence of frames forming a shot, each frame comprising at least two images, each image at a different image position in the sequence and acquires from a corresponding image capturing device, wherein each pair of adjacent images having an overlap region a local alignment module executed by a processor of the system to determine for each frame of a selected number of frames of the shot, a set of local alignment values for the images of each pair of adjacent image positions of the frame;

a global alignment module executed by the processor to determine a single set of global alignment values for all frames of the shot including one global alignment value each of the same pairs of adjacent image positions of all frames which is based on each of the local alignment values for the corresponding pair of adjacent image positions of the selected frames; and a combining module executed by the processor to apply each global alignment value to at least one image of the images at the corresponding pair of adjacent image positions of each frame to adjust a position of the at least one image to the other image.

27. A computer-readable medium including instructions executable by a processing system for performing a method comprising:

receiving a sequence of frames forming a shot, each frame comprising a sequence of at least two images, each image at a different image position in the sequence with the images at each pair of adjacent image positions having an overlap region;

determining a set of local alignment values for each frame of a plurality of selected frames of the shot, each set of local alignment values including one local alignment value for the images of each pair of adjacent image positions of the selected frame;

determining a single set of global alignment values for all frames of the shot, one global alignment value for the same pair of adjacent image positions of each frame; and applying each global alignment value to at least one of the images of the corresponding pair of adjacent image positions of each frame.

28. A method comprising:

receiving, with a processing system, a sequence of p frames, the p frames together forming a shot, each of the p frames comprising a sequence of n images at n image positions acquired from a corresponding image capturing device for each image position, wherein the images at each of n−1 pairs of adjacent image positions have an overlap region;

determining, with a processor of the imaging system, p sets of local alignment values, one for each of the p frames, each of the p sets of local alignment values including n−1 local alignment values, one local alignment value for the images at each of the n−1 pairs of adjacent image positions, wherein each of the n−1 local alignment values is based on minimizing a difference of a selected parameter in the overlap region between the images at the corresponding pair of adjacent image positions;

determining, with the processor, one set of global alignment values for the shot, the set of global alignment values including n−1 global alignment values, one global alignment value for each of the n−1 pairs of adjacent image positions of all p frames of the shot, wherein each of the n−1 global alignment values is based on the p local alignment values of corresponding pair of adjacent image positions of all sets of local alignment values; and applying, with the processing system, each of the n−1 global alignment values to one of the images at the corresponding pair of adjacent image positions of each of the p frames to adjust a position of the one image relative to the other image.

29. The method of claim 28, wherein n and p are integer values greater than one.

30. The method of claim 28, wherein the selected parameter comprises values associated with one or more color channels of pixels in the overlap region.

* * * * *

UNITED STATES PATENT AND TRADEMARK OFFICE
CERTIFICATE OF CORRECTION

PATENT NO. : 7,756,358 B2  Page 1 of 1
APPLICATION NO. : 11/000660
DATED : July 13, 2010
INVENTOR(S) : Yining Deng et al.

It is certified that error appears in the above-identified patent and that said Letters Patent is hereby corrected as shown below:

In column 11, line 51, in Claim 25, delete "frame," and insert -- frame --, therefor.

In column 11, line 57, in Claim 26, delete "acquires" and insert -- acquired --, therefor.

In column 12, line 10, in Claim 26, after "image" insert -- relative --. (First occurrence)

Signed and Sealed this
Twenty-seventh Day of November, 2012

David J. Kappos
*Director of the United States Patent and Trademark Office*